Nov. 24, 1964   P. D. MYERS   3,158,059
RELEASABLE FASTENER
Filed March 1, 1960   2 Sheets-Sheet 1

*INVENTOR.*
PAUL D. MYERS
BY
Lyon & Lyon
ATTORNEYS.

Nov. 24, 1964   P. D. MYERS   3,158,059
RELEASABLE FASTENER
Filed March 1, 1960   2 Sheets-Sheet 2

INVENTOR.
PAUL D. MYERS
BY
ATTORNEYS.

United States Patent Office 3,158,059
Patented Nov. 24, 1964

3,158,059
RELEASABLE FASTENER
Paul D. Myers, La Canada, Calif., assignor to Aerpat Aktien Gesellschaft, Glarus, Switzerland, a corporation of Switzerland
Filed Mar. 1, 1960, Ser. No. 12,054
5 Claims. (Cl. 85—77)

This invention relates to releasable threaded fasteners and is particularly directed to an improved fastening device for engaging an internally threaded socket. It is the principal object of this invention to provide a releasable fastener of this type which establishes a connection by relative axial motion or by helical turning motion, or both. The invention is particularly useful in connection with a fastener device which may be axially inserted without rotation into a threaded socket to form a loose connection preventing disassembly, and wherein a tight connection without looseness may be obtained if desired merely by rotating an exposed part of the device. Another object of this invention is to provide a releasable fastener of this type capable of sustaining either tension loads or shear loads, or both.

Other objects and advantages will appear hereinafter.

Figure 1:
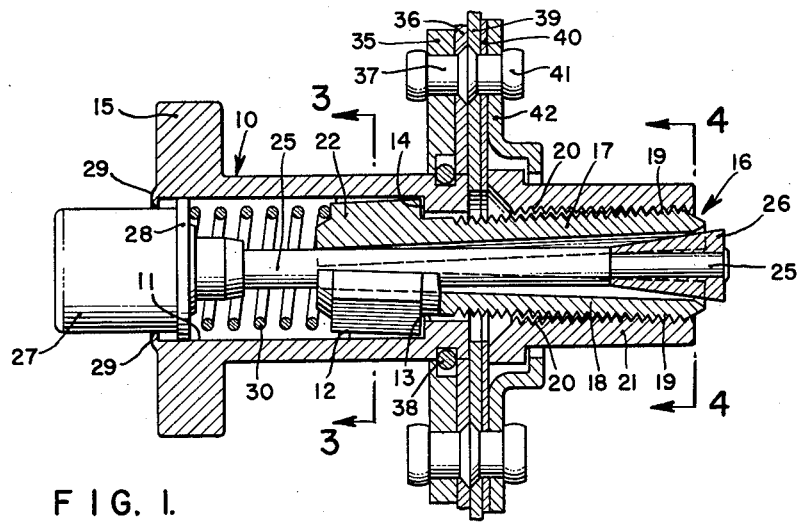
FIGURE 1 is a sectional elevation showing a preferred embodiment of this invention, the parts thereof being illustrated in engaged position.

Referring to the drawings, the tubular shell generally designated 10 is provided with an axially extending central bore 11. The major portion of this bore 11 is cylindrical and a minor portion thereof takes the form of a hexagonal or otherwise noncircular opening 12. A coaxial entrance opening 13 is provided at one end of the shell 10. This entrance opening 13 terminates at the annular radial shoulder 14 presenting an annular seating surface in a plane at right angles to the axis of the shell 10. A knurled flange 15 is provided on the opposite end of the shell 10 from the entrance opening 13.

A split sleeve member generally designated 16 comprises a pair of longitudinally extending duplicate stem segments 17 and 18 provided with external threads 19 for engagement with the internal threads 20 of the socket or nut 21. The split sleeve member 16 is provided with an enlarged head 22 which is hexagonal or otherwise noncircular to fit slidably but nonrotatably within the correspondingly shaped opening 12 within the shell 10. An annular abutment 23 on the inner end of the enlarged head portion 22 engages the annular internal shoulder 14 on the shell 10.

A plunger 25 projects axially through the interior of the split sleeve member 16 and is provided with a tapered enlargement 26 at its projecting end. The other end of the plunger 25 is fixed to the actuator button 27 which projects from the bore 11 beyond the knurled flange 15. A rim 28 on the button 27 is slidably guided within the bore 11. Staking 29 on the shell 10 engages the rim 28 to limit travel of the button 27.

Figure 2:
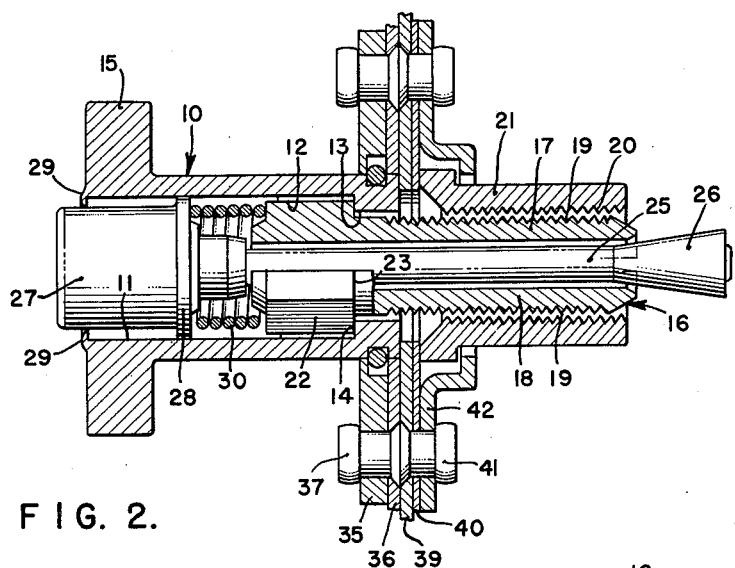
FIGURE 2 is a sectional view similar to FIGURE 1, but with the parts illustrated in released position.
Figure 5:
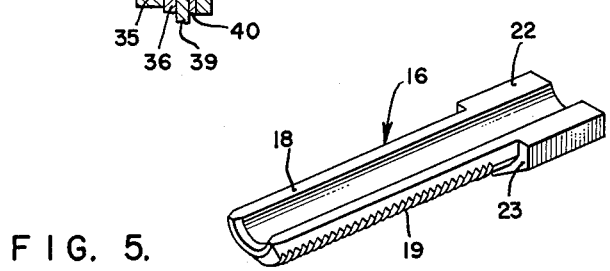
FIGURE 5 is a perspective view of one of the split sleeve segments.
Figure 3:
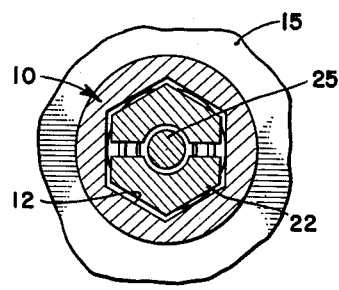
FIGURE 3 is a transverse sectional view, partly broken away, taken substantially on lines 3—3, as shown on FIGURE 2.
Figure 4:
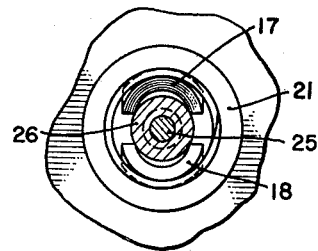
FIGURE 4 is a transverse sectional view, partly broken away, taken substantially on lines 4—4 as shown on FIGURE 1.

A coil spring 30 is mounted within the bore 11 of the shell 10. One end of the spring engages the button 27 and the other end engages the outer ends of both halves of the enlarged head 22 of the split sleeve member 16. The action of the coil spring 30, as shown in FIGURES 1 and 2 of the drawings, is to move the plunger 25 to the left, thereby moving the tapered enlargement 26 into the interior of the split sleeve member 16 to move the stem segments 17 and 18 and spread them from the release position shown in FIGURE 2 to the engaged position shown in FIGURE 1. Spring 30 also presses the enlarged head portion 22 against shoulder 14. This causes a rocking movement of the stem segments 17 and 18 about the points of engagement of abutments 23 with the internal shoulder 14 until the abutments on the two half parts are seated flat on shoulder 14.

When the actuator button 27 is depressed to move the parts to the position shown in FIGURE 2, the action of the spring 30 on the segments 17 and 18 is to cause full seating of the abutments 23 on the shoulder 14 and this effects swinging of the segments back from the spread position of FIGURE 1 to the parallel position of FIGURE 2, the tapered enlargement 26 having been moved out of contact with the segments.

It should be noted that the split sleeve member 16 functions as a split-bolt formed of at least two separate longitudinal segments, each having an enlarged head portion located within the bore 11 of shell 10 and each segment having an externally threaded end portion for engaging the internal threads of socket 21. The tapered portion 26 of plunger 25 cooperates with the end portions of the segments and functions as cam means for spreading apart the threaded ends of the segments when plunger 25 is moved axially by spring 30.

If desired, attaching plates 35 and 36 connected by rivets 37 may be mounted on the outer surface of the shell by means of the split ring 38, and similarly, attaching plates 39 and 40 connected by rivets 41 provide a mounting for the retainer 42 for the internally threaded socket 21. The action of the releasable fastener is to engage the internal threads 20 to prevent separation of the plates 36 and 39.

Figure 6:
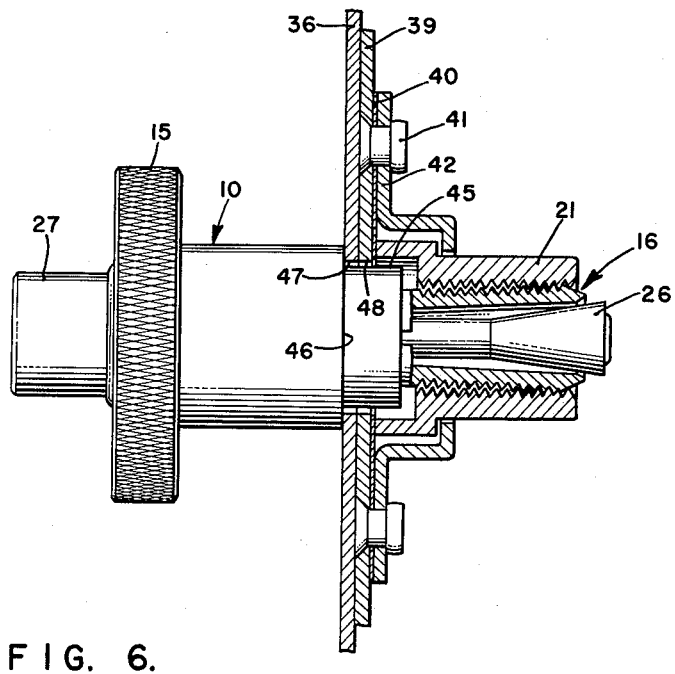
FIGURE 6 is a side elevation, partly in section, showing a modification.

In the modified form of the invention shown in FIGURE 6, the end of the shell 10 remote from the flange 15 is reduced in diameter to provide a cylindrical pilot 45 terminating in an external shoulder 46.

The plate 35 and rivets 37 are omitted. The central openings 47 and 48 in the plates 36 and 39 receive the pilot 45 on the shell 10, thereby improving the shear strength of the fastener device. In other respects, the construction and operation are the same.

Having fully described my invention, it is to be understood that I do not wish to be limited to the details set forth above, but my invention is of the full scope of the appended claims.

I claim:

1. A releasable fastener for engaging within an internally threaded socket, comprising in combination: a tubular shell having a central axial opening and provided with an internal annular shoulder, a split sleeve member having an enlarged head slidably received in said opening and provided with an annular abutment engaging said shoulder, co-operating means on the shell and sleeve member preventing relative rotation between said split sleeve and said tubular shell, said split sleeve member having a reduced stem portion projecting outside said tubular shell and provided with external threads for engagement with the internally threaded socket, said split sleeve member being split throughout its length into at least two longitudinal segments having externally threaded portions which are supported out of contact with the threads of said socket when the abutments on the head portions of said segments are seated flat on said annular shoulder, a plunger extending axially through the split sleeve member and having a tapered enlargement extending out of the threaded end of said split sleeve, and resilient means mounted within said shell and acting on said head portions to yieldably press said abutments into flat seating engagement with said shoulder, said plunger being movable longitudinally in a direction to cause said tapered enlargement to spread the projecting ends of the segments into threaded engagement with the socket.

2. A releasable fastener for engaging within an internally threaded socket, comprising in combination: a tubular shell having a central axial opening of noncircular cross-section and provided with an annular internal shoulder, a split sleeve member slidably mounted in said noncircular opening and provided with an enlarged head portion forming an annular abutment engaging said shoulder, said enlarged head portion having a non-circular cross-section conforming with the non-circular section of the axial opening in said shell to prevent relative rotation between said split sleeve and said shell, said split sleeve member having a reduced stem portion projecting outside of one end of said tubular shell and provided with external threads for engagement with the internal threads of said socket, said split sleeve member being split throughout its length into at least two longitudinal segments having externally threaded portions which are supported out of contact with the threads of said socket when the abutments on the head portions of said segments are seated flat on said annular shoulder, a plunger extending axially through the split sleeve member and having a tapered enlargement extending out of the threaded end of said split sleeve, resilient means mounted within said shell and acting on said head portions to yieldably press said abutments into flat seating engagement with said shoulder, and resilient means within said central axial opening acting to move the plunger longitudinally in a direction to cause said tapered enlargement to spread the projecting ends of the segments into threaded engagement with the socket.

3. A releasable fastener for engaging with an internally threaded socket, comprising in combination: a tubular shell having a central axial opening of polygonal cross-section and provided with an annular internal shoulder, a split sleeve member slidably mounted in said polygonal opening and provided with an enlarged head portion forming an annular abutment engaging said shoulder, said enlarged head portion having a polygonal cross-section conforming with the polygonal section of the axial opening in said shell to prevent relative rotation between said split sleeve and said shell, said split sleeve member having a reduced stem portion projecting outside of one end of said tubular shell and provided with external threads for engagement with the internally threaded socket, said split sleeve member being split throughout its length into at least two longitudinal segments having externally threaded portions which are supported out of contact with the threads of said socket when the abutments on the head portions of said segments are seated flat on said annular shoulder, a plunger extending axially through the split sleeve member and having a tapered enlargement extending out of the threaded end of said split sleeve, an actuator element fixed to the other end of the plunger and extending out of the end of said shell, and a coil spring within said central axial opening interposed between said enlarged head of said split sleeve and said actuator element, said coil spring acting to move the plunger longitudinally in a direction to cause said tapered enlargement to spread the projecting ends of the segments into threaded engagement with the socket, and said spring acting on the head portions of the split sleeve segments to yieldably press said abutments into flat engagement with said shoulder when said tapered enlargement is out of engagement with the ends of said segments.

4. A releasable fastener for engaging within an internally threaded socket, comprising in combination: a handle member comprising a tubular shell having a central axial opening, a split-bolt member formed of at least two separate longitudinal segments each having an enlarged head portion located in said opening, each segment of said split-bolt member having a stem portion projecting outside of one end of said tubular shell and provided at its projecting end with an externally threaded portion for engagement with the threads of the internally threaded socket, co-operating means on the shell and bolt member preventing relative rotation between the shell and the bolt segments, means providing a pivotal connection between said shell and each bolt segment to provide for movement of the threaded portion of the segment towards and away from the axis of said split-bolt member, spring means normally acting on said segments in a direction to move the threaded portions thereof towards said axis, a plunger extending axially between the segments of said split-bolt member and being slidable along the axis of said bolt member, and cam means connecting each segment with said plunger to effect outward movement of the threaded portions of said segments upon axial movement of the plunger in one direction to spread the threaded portions of the segments into threaded engagement with the internal threads of the socket.

5. A releasable fastener according to claim 4 wherein the cam portion on said plunger comprises an enlarged tapered portion on the projecting end of said plunger, an actuator element fixed to the other end of the plunger and extending out of one end of said shell, and said resilient means comprises a coil spring within said central axial opening interposed between the enlarged heads of said segments and said actuator element, said coil spring acting to move the plunger longitudinally in a direction to cause said tapered enlargement to spread the projecting ends of the segments into threaded engagement with the socket, and said spring acting on said head portions to yieldably press said head portions into engagement with said shoulder when said tapered enlargement is out of engagement with the ends of said segments.

References Cited in the file of this patent

UNITED STATES PATENTS

| 2,570,618 | Werner | Oct. 9, 1915 |
| 2,280,403 | Finkle | Apr. 12, 1942 |
| 2,737,222 | Becker | Mar. 6, 1956 |
| 2,775,155 | Tompkins et al. | Dec. 25, 1956 |
| 2,882,579 | Modrey | Apr. 21, 1959 |

FOREIGN PATENTS

| 502,374 | Great Britain | Mar. 16, 1939 |